July 1, 1952          A. C. HALTER          2,601,957
CONTROL SYSTEM FOR MATCHING THE SPEEDS OF MILLS AND REELS
Filed Nov. 5, 1949
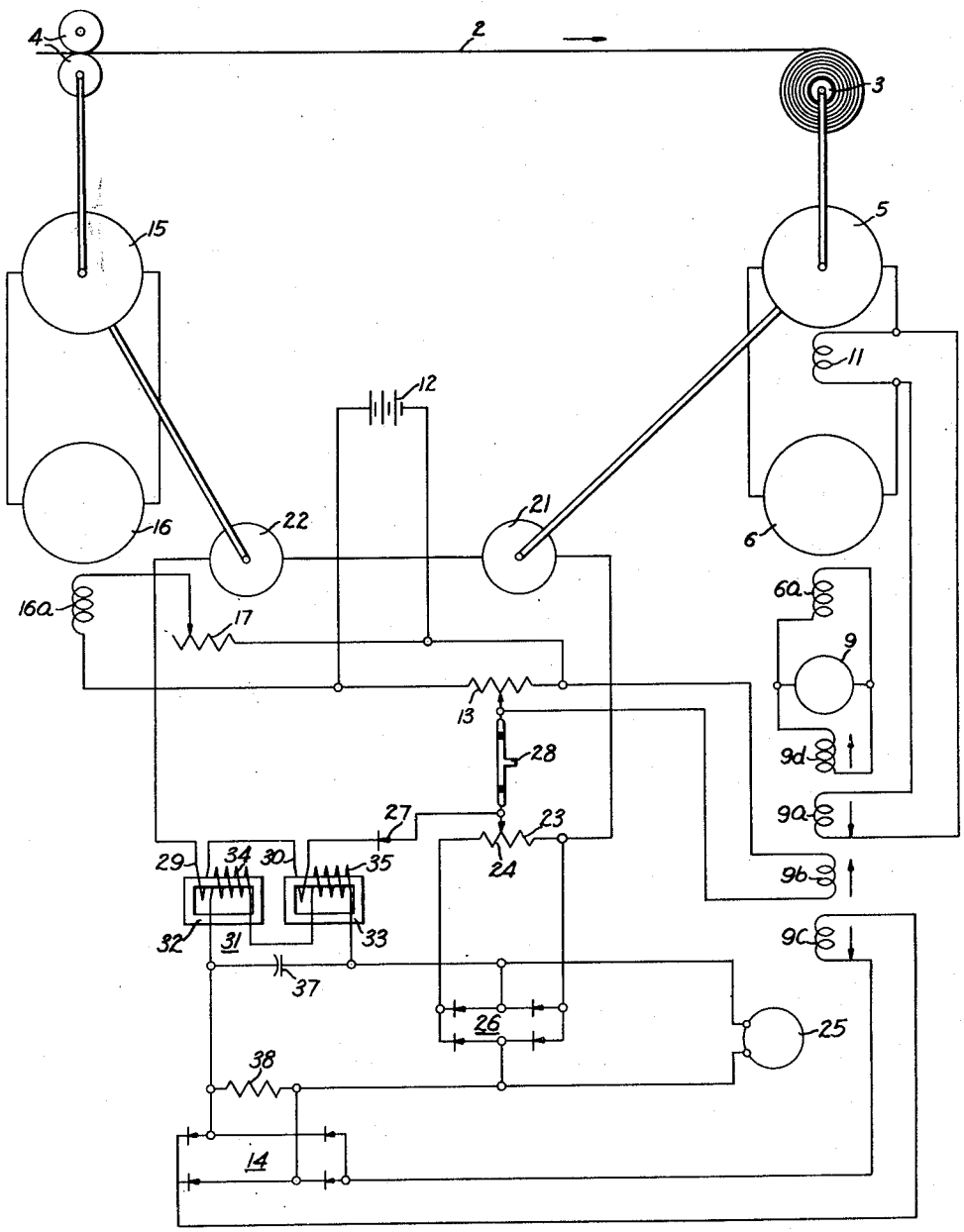
Inventor
Allan C. Halter
by Didier Journeaux
Attorney

UNITED STATES PATENT OFFICE 2,601,957

CONTROL SYSTEM FOR MATCHING THE SPEEDS OF MILLS AND REELS

Allan C. Halter, Milwaukee, Wis., assignor to Allis-Chalmers Manufacturing Company, Milwaukee, Wis., a corporation of Delaware Application November 5, 1949, Serial No. 125,711

5 Claims. (Cl. 242—75)

This invention relates in general to systems for controlling the relative speed of rotation of a mill and a reel, and in particular to systems for limiting the maximum speed of rotation of a reel relative to the speed of the associated mill.

In rolling mills where a strip of material is threaded, i. e., is secured to a reel after passing through the rolls of the mill, it is desirable to limit the speed of the reel during this threading operation to a value slightly higher than the speed of the rolls feeding the strip to the reel. Prior systems of this type utilize two tachometer generators to furnish voltages proportional to the speeds of the reel and the rolls respectively. During threading, if the voltage proportional to the speed of the reel exceeds the voltage proportional to the speed of the rolls, a speed limiting voltage is supplied, in a direction to decrease the speed of the reel, to a field winding which controls the speed of a motor driving the reel.

Such systems usually provide an additional field winding, the excitation of which is varied to vary the tension in the strip as it is winding on the reel, and the speed of the reel during threading is proportional to the difference between the excitations of the two field windings. Such systems have the disadvantage that variations in the excitation of the tension adjusting field winding during winding operation vary the net excitation of the two field windings during subsequent threading and cause the reel then to be driven at a speed dependent upon the excitation of the tension adjusting field winding. These systems are unsatisfactory because it is desirable to have the reel run at a constant speed during threading regardless of the excitation of the tension adjusting field winding.

These disadvantages can be overcome by modifying the difference between the voltages of the tachometer generators simultaneously with variations in the excitation of the tension adjusting field winding so as to maintain a predetermined net excitation of the field windings during threading and thereby cause the reel then to run at a constant speed for all varying adjustments of the tension in the strip.

It is therefore an object of this invention to provide a system for controlling the speed of a reel during threading of a strip in which variations in the tension setting of the strip during winding are ineffective to vary the speed of the reel during threading.

It is a further object of this invention to provide a system for controlling a reel differentially responsive to a speed limiting voltage and a setting voltage during threading and differentially responsive to the setting voltage and a balancing voltage during winding in which adjustments of the speed limiting voltage and of the setting voltage are so effected as to maintain the speed of the reel at a predetermined value during threading.

Objects and advantages other than those stated above will be apparent from the following description when read in connection with the accompanying drawing.

The single figure of the drawing diagrammatically illustrates one embodiment of the invention utilizing a magnetic amplifier to control the reel motor.

Referring to the drawing, the invention is shown applied to the control of the speed of a reel 3 to which a strip of material 2 is fed from a work device such as the rolls 4 of the last stand of a rolling mill. Reel 3 is driven by a motor 5 which is supplied with current from a generator 6 in a closed loop circuit. Generator 6 is provided with a field winding 6a which is energized by an exciter generator 9. Exciter generator 9 is provided with four field windings 9a, 9b, 9c and 9d, the energization of which determines the output voltage of exciter 9.

Field winding 9a is connected across an interpole winding 11 of motor 5 to be thereby energized by a balancing voltage which is a measure of the armature current of motor 5. Field winding 9b is energized with a setting voltage from any suitable source such as a battery 12 through a voltage divider 13; the magnetomotive force of winding 9b is in a direction to oppose the magnetomotive force of field winding 9a. The adjustable tap of voltage divider 13 may be moved back and forth to raise or lower the tapped voltage supplied to field winding 9b. Voltage divider 13 therefore constitutes rheostat means for producing a voltage variable in either of two senses. Field winding 9c is energized from the direct current terminals of a full wave rectifier 14 and is connected to aid the magnetomotive force of field winding 9a and to oppose the magnetomotive force of field winding 9b. Self excited field winding 9d is connected across the armature terminals of exciter generator 9 to provide the greater part of the excitation for exciter 9.

Rolls 4 of the mill are driven by an electric motor 15 which is supplied with current by a generator 16 in a closed loop circuit. A field winding 16a of generator 16 is supplied with adjustable excitation from source 12 through an adjustable resistor 17.

To supply a voltage proportional to the speed of reel 3 and motor 5, any suitable means such as a tachometer generator 21 driven by motor 5 is provided. To supply a voltage proportional to the speed of the strip 2, a second tachometer generator 22 is connected to be driven by motor 15. Tachometer generators 21 and 22 are interconnected so that their respective output voltages oppose each other. Connected in the circuit of tachometer generators 21 and 22 is a portion 23 of a voltage divider 24 energized from any suitable alternating current source such as a generator 25 through a suitable full wave rectifier 26 for providing a bias voltage. Owing to the connection of rectifier 26, the tapped voltage of voltage divider portion 23 is of a polarity to aid the voltage of generator 21. A rectifier 27 is also connected in series with generators 21 and 22 and is so poled as to allow current to flow between the generators only when the sum of the voltages of generator 21 and voltage divider portion 23 exceeds the voltage of generator 22.

The adjustable tap on voltage divider 24 provides means for raising or lowering the tapped voltage of voltage divider 24 to modify the difference between the voltage of generator 22 and the sum of the voltage of generator 21 and of the tapped voltage of voltage divider 24 in either of two senses. The adjustable taps on voltage dividers 13 and 24 are provided with a common actuating means 28, to provide simultaneous operation of both voltage dividers. In the embodiment illustrated, movement of the common actuating means varies the tapped voltages of both voltage dividers in the same sense, that is, increases both voltages or decreases both voltages, but it will be apparent that the voltages could be made to vary in opposite senses if desired.

Connected to be energized by the difference between the joint voltage of generator 21 and voltage divider portion 23, and the voltage of generator 22 only when the former voltage exceeds the latter voltage are the control windings 29 and 30 of a variable impedance device such as a saturable reactor 31. Reactor 31 is also provided with two similar cores 32 and 33 and a pair of reactance windings 34 and 35. Reactance windings 34 and 35 are energized from any suitable alternating current source such as generator 25.

Variations in the current in control windings 29 and 30 of reactor 31 operate in a well known manner to vary the saturation of cores 32 and 33 and produce amplified variations in the current of windings 34 and 35. This current is rectified by rectifier 14 and supplied to field winding 9c to render winding 9c energized by a control voltage only when the sum of the voltage of generator 21 and the tapped voltage of voltage divider 24 is greater than the voltage of generator 22.

A capacitor 37 connected across reactance windings 34 and 35 produces a resonant circuit with these windings when no current traverses control windings 29 and 30, thereby increasing the impedance offered to current from source 25 and reducing the current of windings 34 and 35 and field winding 9c under such conditions. A resistor 38 connected across the alternating current terminals of rectifier 14 provides a low resistance by-pass for rectifier 14 and causes the major part of the no load current of windings 34 and 35 to traverse resistor 38 rather than rectifier 14 and winding 9c. Capacitor 37 and resistor 38 therefore both function to reduce the excitation of winding 9c to a negligible value when no current flows in control windings 29 and 30.

In operation of the system, generators 6, 9 and 16 are driven by any suitable motive power sources (not shown). With generators 6, 9 and 16 being driven by their respective motive power sources and before a strip enters the mill, the voltage of field winding 16a is reduced through adjustable resistor 17 to reduce the output voltage of generator 16 and consequently cause motor 15 to run at a speed below normal. The output voltage of generator 9 builds up through the action of field windings 9b and 9d to cause generator 6 to produce an increasing output voltage and thereby cause motor 5 to accelerate.

For the purpose of this explanation it will be assumed that motors 5 and 15 operate at the same speed during winding of the strip on the reel, although in practice such is not always the case.

The strip 2 is then fed through rotating rolls 4 and secured to reel 3. During this so-called threading operation it is desired to limit the speed of motor 5 to a value slightly higher than that of motor 15. With no strip winding on reel 3, the current through the armature and interpole winding 11 of motor 5 is very small and field winding 9a is consequently energized to a negligible extent.

When the speed of motor 5 is below the speed of motor 15, the sum of the voltage of generator 21 and of the tapped voltage of voltage divider 24 is lower than the voltage of generator 22, and rectifier 27 blocks any flow of current between the generators. With no current flowing through control windings 29 and 30 of reactor 31, field winding 9c is energized only to a negligible extent and motor 5 will continue to accelerate until limited by saturation of machines 9 and 6 or limited by the action described below.

If the speed of motor 5 tends to increase above the speed of motor 15, the sum of the voltage of generator 21 and of the tapped voltage of voltage divider 24 exceeds the voltage of generator 22, and current flows through control windings 29 and 30. Such current flow causes the voltage drop of reactance windings 34 and 35 to decrease, so that generator 25 impresses a voltage on field winding 9c through rectifier 14. This rectified voltage applied to winding 9c, being of a polarity to oppose the action of field windings 9b and 9d, decreases the net excitation of machine 9 and causes a decrease in speed of motor 5. The voltage of generator 21 accordingly decreases, reducing the voltage applied to control windings 29 and 30 and thereby reducing the voltage impressed on winding 9c through rectifier 14. Winding 9c continues to be energized by a voltage sufficient to limit the net excitation of machine 9 so as to limit the speed of motor 5 to a predetermined value during threading. Field windings 9b and 9c therefore constitute means differentially responsive to two voltages for limiting the speed of motor 5 to a predetermined value dependent on speed of motor 15, during the threading operation.

When the threading is completed and the strip starts to wind on the reel 3, motor 5 slows down under this load on the reel, increasing the current in the armature and interpole 11 of motor 5 and decreasing the speed of generator 21. With increased current in interpole winding 11, the excitation of field winding 9a is increased, and with a decrease in the speed of generator 21 below the speed of generator 22, field winding 9c is deenergized. This action of field windings 9a and 9c provides a smooth transfer of the control of reel 3 from speed matching for the threading operation to tension regulating for the winding operation.

As the strip is winding on the reel, the tension in the strip is controlled by the differential action of field windings 9a and 9b. Variations in the tension of the strip produce variations in the current in interpole winding 11 and thereby vary the balancing voltage applied to winding 9a so as to maintain the tension substantially constant. Changes in the desired tension of the strip during winding may be made by varying the position of the adjustable tap of voltage divider 13 to vary the excitation of field winding 9b. The field windings of machine 9 are therefore differentially responsive to two voltages for controlling the tension in strip 2 as the strip is winding on the reel.

When the end of the strip leaves the rolls 4, the reel 3 is stopped and the wound strip removed from reel 3. The reel is then started again and will accelerate to match the mill speed as described above. If the position of the adjustable tap of voltage divider 13 were varied without varying the adjustment of voltage divider 24 to vary the tension in the strip while the strip is winding on the reel, when the next strip is threaded into the mill the magnitude of the current through field winding 9b would be different from the magnitude of the current in winding 9b during the previous threading operation. If the variation in current were an increase in field winding 9b, field winding 9c would have to be energized by a current higher than that required during the previous threading operation to limit the speed of motor 5 and reel 3. This requirement for increased current in field 9c would require the generator 21 to run at a higher speed in order to produce increased excitation of field winding 9c and would result in the speed of motor 5 being limited at a higher value than that for the previous threading operation.

This invention provides means for limiting the speed of the reel to the same speed during threading for all settings of voltage divider 13. Such means include the common actuating means 28 for the adjustable taps on voltage dividers 13 and 24. Owing to this common actuating means, when the voltage supplied to field winding 9b is varied by adjusting the tap of voltage divider 13, the voltage of voltage divider 24 is varied in the same sense to vary the voltage supplied in series with the voltage of generator 21 and thereby modify the differential voltage applied to control windings 29 and 30. If the voltage supplied to field winding 9b by voltage divider 13 is increased, the voltage supplied in series with generator 21 by voltage divider portion 23 is simultaneously increased, increasing the differential voltage applied to control windings 29 and 30 and consequently increasing the control voltage applied to field winding 9c.

Voltage dividers 13 and 24 and field windings 9b and 9c are so designed that the variation in the voltage supplied to field winding 9b by voltage divider 13 are compensated for by the modification of the differential voltage applied to control windings 24 and 25 by voltage divider 24. This action will limit the net excitation flux of machine 9 during the threading operation and will consequently limit the speed of machine 5 and reel 3 to a predetermined value dependent on mill speed, during threading regardless of the setting of voltage divider 13.

Although but one embodiment of the present invention has been shown and described, it will be apparent to those skilled in the art that various changes and modifications may be made therein without departing from the spirit of the invention or from the scope of the appended claims. In particular, while the embodiment of the invention illustrated relates to the control of the speed of a reel during threading of a strip of material on the reel preparatory to winding the strip on the reel, it will be apparent that the invention could be applied to the control of the relative speeds of any rotating objects.

It is claimed and desired to secure by Letters Patent:

1. In a system for controlling the speed of a reel to which a strip of material is fed from a work device, the combination of a dynamoelectric machine for driving said reel, a first field winding for controlling the power delivered to said dynamoelectric machine, means for producing a first voltage proportional to the speed of said machine and of said reel, means for producing a second voltage proportional to the speed of said strip, a second field winding energized by a control voltage depending upon the difference between said first and second voltages only when the values of said first and second voltages are in a predetermined relation, said second field winding being connected to oppose said first field winding to cause the speed of said reel to have a predetermined value relative to the speed of said strip previously to winding said strip on said reel, rheostat means for adjusting the excitation of said first field winding, a rheostat for modifying said control voltage, and means for operating said rheostat simultaneously with said rheostat means to vary the tension of said strip during winding and cause the speed of said reel to return to said predetermined value when said strip leaves said work device.

2. In a system for controlling the speed of a reel to which a strip of material is fed from a work device, the combination of a dynamoelectric machine for driving said reel, means for producing a first voltage proportional to the speed of said reel, means for producing a second voltage proportional to the speed of said strip, means for producing a control voltage depending on the difference between said first and said second voltages only when the values of said first and second voltages are in a predetermined relation, rheostat means for producing a third voltage variable in either of two senses, field winding means differentially responsive to said control voltage and said third voltage for controlling the power delivered to said machine, a rheostat for modifying said control voltage in either of two senses, and means for operating said rheostat simultaneously with said rheostat means to vary said control voltage and said third voltage in the same sense to cause the speed of said machine to be in a predetermined relation to the speed of said strip independently of variations in said third voltage.

3. In a system for controlling the speed of a reel to which a strip of material is fed from a work device, the combination of a dynamoelectric machine for driving said reel, means connected with said reel for producing a first voltage proportional to the speed of said reel, means connected with said work device for producing a second voltage proportional to the speed of said work device, means connected with the first and second said means for producing a control voltage depending upon the difference between said first voltage and said second voltage only when the magnitudes of said first and said second voltages are in a predetermined relation, means for producing a third voltage of constant magnitude, means connected with said machine responsive to the current in said machine for producing a fourth voltage, first field winding means differentially responsive to said third and fourth voltages for controlling the power delivered to said machine to maintain tension in said strip during winding of said strip on said reel, second field winding means responsive to said control voltage cooperating with said first field winding means for causing the speed of said reel to have a predetermined value relative to the speed of said work device before winding of said strip on said reel, rheostat means for varying the value of said third voltage to vary the tension in said strip during said winding, a rheostat for varying the value of said control voltage, and means for operating said rheostat simultaneously with said rheostat means to return the speed of said reel to said predetermined value independently of variations in said third voltage after completion of winding of said strip on said reel.

4. In a system for controlling the speed of a reel to which a strip of material is being fed from a work device, the combination of a dynamoelectric machine for driving said reel, means for producing a first voltage proportional to the current in said machine, means for producing a second voltage of adjustable constant value, first field winding means differentially responsive to said first and said second voltage for controlling the power delivered to said machine to maintain tension in said strip during winding of said strip on said reel, means for producing a third voltage proportional to the speed of said reel, means for producing a fourth voltage proportional to the speed of said strip, means for producing a bias voltage, means for producing a fifth voltage equal to the sum of said third and said bias voltages, variable impedance means differentially responsive to said fourth and said fifth voltages only when said fifth voltage exceeds said fourth voltage for producing a control voltage, second field winding means differentially responsive to said second and said control voltages cooperating with said first field winding means for causing the speed of said machine and said reel to have a predetermined value relative to the speed of said strip during threading operation, rheostat means for varying said second voltage to vary the tension in said strip during said winding, a rheostat for varying said bias voltage to vary said control voltage, and means for operating said rheostat simultaneously with said rheostat means to maintain the speed of said reel during threading at said predetermined value independently of variations in said second voltage.

5. In a system for controlling the speed of a reel to which a strip of material is fed from a work device, the combination of a dynamoelectric machine for driving said reel, means connected to said machine for producing a first voltage proportional to the speed of said reel, means connected to said work device for producing a second voltage proportional to the speed of said work device, means for producing a bias voltage, variable impedance means differentially responsive to said second voltage and the sum of said first and said bias voltages only when the sum of said bias voltage and said first voltage exceeds said second voltage for producing a control voltage, means for producing a setting voltage, field winding means for controlling the power delivered to said machine differentially responsive to said setting voltage and said control voltage for causing the speed of said reel to have a predetermined value relative to the speed of said work device before winding of said strip on said reel, means connected to said machine for producing a balancing voltage proportional to the current in said machine, said field winding means being differentially responsive to said balancing and said setting voltages for controlling the tension in said strip during winding of said strip on said reel, rheostat means for varying said setting voltage to vary the tension in said strip during said winding, a rheostat for varying said control voltage, and means for operating said rheostat simultaneously with said rheostat means to maintain the speed of said reel at said predetermined value after winding of said strip on said reel.

ALLAN C. HALTER.

REFERENCES CITED

The following references are of record in the file of this patent:

UNITED STATES PATENTS

| Number | Name | Date |
|---|---|---|
| 2,306,157 | Edwards et al. | Dec. 22, 1942 |